(No Model.)　　　　　　　　　　　　　　　　　2 Sheets—Sheet 1.
J. H. KIRBY.
MILKING MACHINE.

No. 335,287.　　　　　　　　　　Patented Feb. 2, 1886.

WITNESSES
Phil C. Dittrich.
Wm. Bagger

J. H. Kirby,
INVENTOR
by Louis Bagger & Co.
Attorneys (No Model.) 2 Sheets—Sheet 2.
J. H. KIRBY.
MILKING MACHINE.
No. 335,287. Patented Feb. 2, 1886.
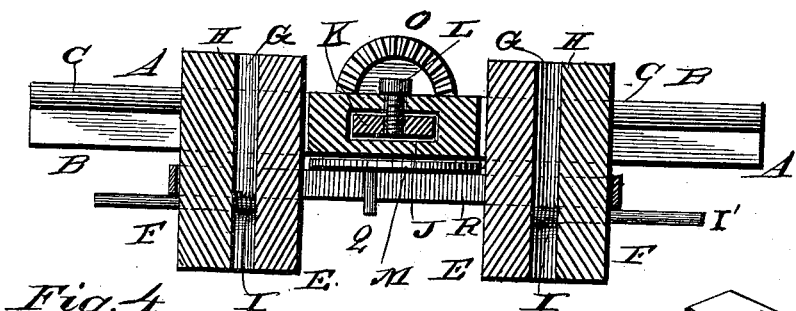
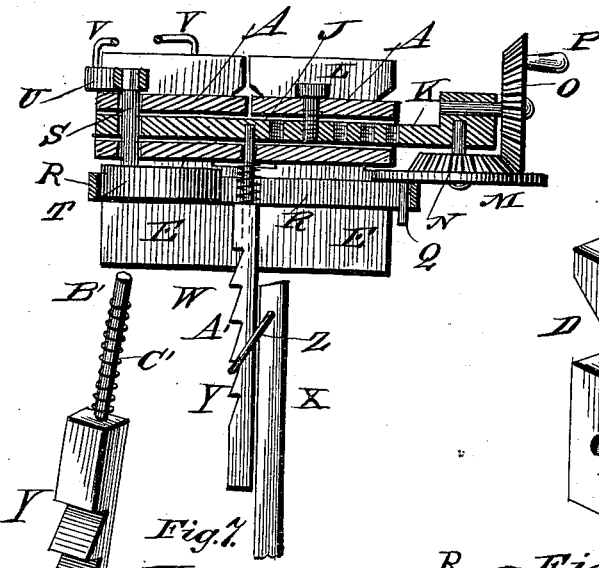
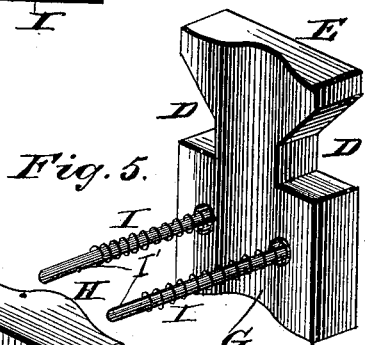
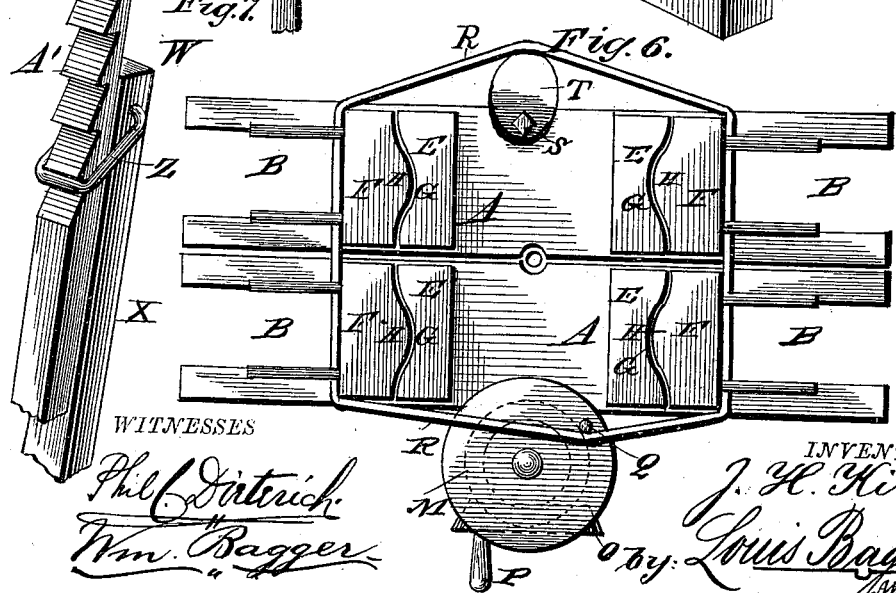
WITNESSES
INVENTOR

UNITED STATES PATENT OFFICE.

JOE H. KIRBY, OF LAWLER, IOWA.

MILKING-MACHINE.

SPECIFICATION forming part of Letters Patent No. 335,287, dated February 2, 1886.

Application filed April 24, 1885. Serial No. 163,277. (No model.)

*To all whom it may concern:*

Be it known that I, JOE H. KIRBY, a citizen of the United States, and a resident of Lawler, in the county of Chickasaw and State of Iowa, have invented certain new and useful Improvements in Milking-Machines; and I do hereby declare that the following is a full, clear, and exact description of the invention, which will enable others skilled in the art to which it appertains to make and use the same, reference being had to the accompanying drawings, which form a part of this specification, and in which—

Figure 1:
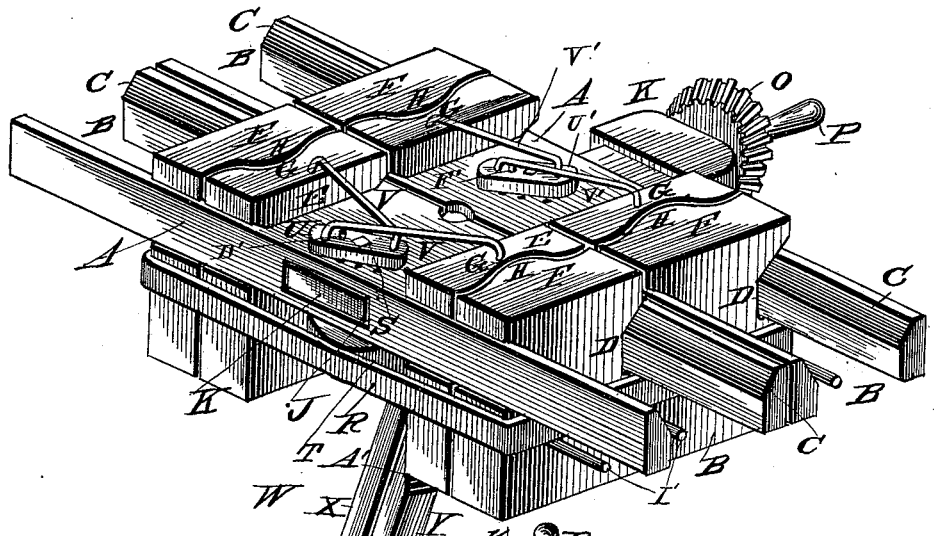
Figure 2:
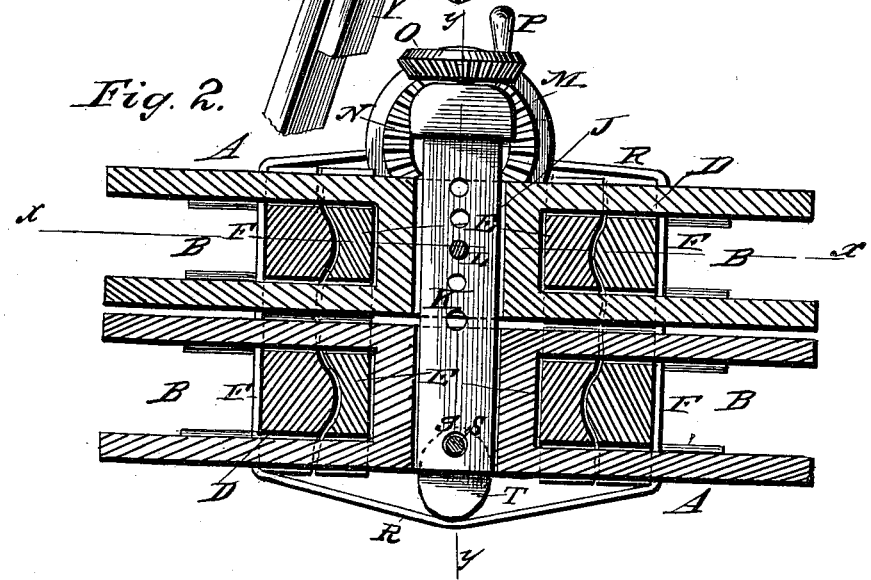

Figure 1 is a perspective view of my improved milking-machine. Fig. 2 is a horizontal sectional view of the same. Fig. 3 is a longitudinal vertical sectional view taken on the line $x\ x$ in Fig. 2. Fig. 4 is a vertical transverse sectional view taken on the line $y\ y$ in Fig. 2. Fig. 5 is a perspective detail view of a pair of the milking-clamps. Fig. 6 is a bottom view of the device, and Fig. 7 is a detail view of the adjustable leg or support.

The same letters refer to the same parts in all the figures.

This invention relates to machines for milking cows; and it has for its object to provide a device of this class which shall possess superior advantages in point of simplicity, durability, and general efficiency, which may be easily applied and operated, the action of which shall resemble that of milking by hand, and which may be constructed at a reasonable expense.

With these ends in view the invention consists in the improved construction, arrangement, and combination of parts, which will be hereinafter fully described, and particularly pointed out in the claims.

In the accompanying drawings, A represents the two main frames of the machine, the ends of which are recessed, as at B, and beveled, as at C. Four pairs of sliding blocks or milking-clamps, E and F, (each block being recessed at D D,) are movably secured upon said beveled pieces, one pair of said milking-blocks being arranged in each of the recesses B.

The inner blocks or clamps, E E, are provided with vertical recesses or concavities G in their outer sides, adjoining the clamps F, which are provided with correspondingly-convex sides, H, as will be clearly seen in the drawings. Springs I I are suitably arranged between the sides G H of the clamps E F, upon the rods I', tending to force the said clamps apart, or, more properly, to force the outer clamps, F, in an outward direction, the movement inwardly of the clamps E being limited by the frame-pieces in which they are adjusted.

The frame-pieces A A are provided with central transverse openings, J J, for the passage of a cross-bar or connecting-piece, K, on which one of the said frame-pieces may be permanently secured, while the other may be slid or adjusted to any desired position, and retained by means of a set-screw, L. By this construction the machine may be adjusted to fit various-sized udders.

The projecting end of the connecting-bar K is provided with a wheel or disk, M, journaled to its under side, and provided with a bevel-gear, N, meshing with a pinion, O, journaled upon the end of the bar K, as shown, and having a crank or handle, P, by means of which it may be readily manipulated. The disk M has a downwardly-extending eccentrically-located pin or stud, Q, adapted to bear against an elastic band or strap, R, made of rubber or other suitable material, and which is adjusted around the outer clamps of the machine, all of which are thereby connected and at the same time forced toward the inner clamps, E. It will be seen that when the disk M is rotated the pin Q will alternately tighten and slacken the elastic strap, and as the band fits around the clamps above the bearing of the springs I, the tops of the clamps are first pressed against the teats of the udder and held there until released by the action of the machine. As the pressure of the band increases, the springs I are caused to be compressed, and the lower parts of the clamps are brought to bear against the lower parts of the teats, and the milk is forced out as completely as though the operation were being performed by hand. As the tension of the band is decreased by the revolution of the operating wheel and pin, the springs I instantly push the clamps back from the pieces E, and the teats fill with milk ready for the next operation.

S is a short vertical shaft extending through one of the stationary pieces A, and having an eccentric disk, T, at its lower end bearing against the elastic band R, and having a cross-head, U, at its upper end. The ends of this cross-head are connected with the tops of two of the clamps E E by means of the pivoted rods V V. A second cross-head, U', is pivotally secured to the other piece A, between the other two clamps E E, and its ends are connected with the tops of said clamps by means of the pivoted rods V' V'. Each of the cross-heads U and U' is provided with a perforation, which registers with a row of perforations in each of the pieces A A. Two pins, D' and F', fit in said perforations and hold the clamps E in place after they have been adjusted to fit the different-sized udders. When the clamps E E are moved by hand in upon the cross-pieces A A, the shaft S is turned so that the eccentric T takes up the slack in the band R, and when they are moved outward the eccentric is turned in the opposite direction and lets out the slack thus taken up, so that the pressure of the band R upon the clamps remains the same in whatever position the clamps E E are upon the cross-pieces A A; and as the cross-pieces themselves are adjustable upon the cross-bar K, it will be seen that the machine is easily adjusted to operate upon any-sized udder.

W is an adjustable support consisting of rods X Y, the former of which is provided with a pivoted link, Z, adapted to engage a series of notches, A', in the latter, which may thus be adjusted to and retained at any desired height. The upper adjustable rod, Y, is provided at its upper end with a pin, B', adapted to enter a central vertical perforation in the frame-piece K, and having a spring, C', adapted to support the frame in such a manner as to render it capable of a slight vertical movement, and avoiding the stiffness and rigidity which is objectionable in this class of devices.

From the foregoing description, taken in connection with the drawings hereto annexed, the operation and advantages of this invention will be readily understood. The teats are adjusted or inserted between the clamps E F, which are operated in the manner and by the mechanism described, thereby alternately compressing the teats and allowing them to expand, and thereby inducing the milk to flow.

I would have it understood that I do not limit myself to the precise construction and arrangement of parts herein shown and described, as various modifications and structural changes may be adopted without departing from the spirit of my invention.

Having thus described my invention, I claim and desire to secure by Letters Patent of the United States—

1. In a milking-machine, the combination, with a lateral cross-bar, of two cross-pieces adjustably secured thereon, a pair of clamping-blocks sliding upon each end of each of said cross-pieces, the inner block of each pair being laterally adjustable, and means, substantially as described, for forcing the outer blocks against the inner blocks, substantially as and for the purpose set forth.

2. In a milking-machine, the combination, with a lateral cross-bar, of two cross-pieces secured thereon, the outer cross-piece being rigidly secured and the inner one being adjustable by means of a pin passing through it and through holes in the cross-bar, and each end of each of said cross-pieces being provided with longitudinal recess, a pair of clamping-blocks fitting and sliding within each of said recesses, the inner block of each pair being adjustably secured therein, and means, substantially as described, for securing said inner blocks, an elastic band passing around said blocks, and means, substantially as described, for alternately stretching and relaxing said elastic band, substantially as and for the purpose set forth.

3. In a milking-machine, the combination, with a lateral cross-bar, of two cross-pieces secured thereon having recesses in their ends, a pair of clamping-blocks having notches in their sides and fitting within said recesses, the outer surfaces of each of said inner blocks being longitudinally concave and the inner surfaces of said outer blocks being longitudinally convex, a pair of guide-rods projecting outwardly from each of said inner blocks through perforations in each of the outer blocks, a spring upon each of said rods between said blocks, an elastic band passing around said blocks, and means, substantially as described, for alternately stretching and relaxing said band, substantially as and for the purpose set forth.

4. The combination, with the inner blocks of each of the cross-pieces of the above-described milking-machine, of a cross-head pivotally secured to said cross-pieces, rods connecting said blocks with the ends of said cross-heads, respectively, an eccentric cam below the outer cross-piece, a shaft connecting said cam with the outer cross-head, a pin passing through each of said cross-heads and engaging with a row of perforations in each of the cross-pieces, an elastic band passing around said eccentric cam and around the blocks of said machine, and means, substantially as described, for alternately stretching and relaxing said elastic band, substantially as and for the purpose set forth.

5. The combination, with the cross-bar of a milking-machine, of a revolving wheel secured to the end thereof, an eccentric pin secured upon said wheel, two cross-pieces adjustably secured upon said cross-bar, having recesses in their ends, a pair of clamping-blocks having notches in their sides and operating within each of said recesses, an elastic band passing around said blocks and said eccentric pin, means for operating said revolving wheel, substantially as described, and a suitable support for said machine, substantially as and for the purpose set forth.

In testimony that I claim the foregoing as my own I have hereunto affixed my signature in presence of two witnesses.

JOE H. KIRBY.

Witnesses:
W. I. BRANNAGAN,
M. O'REILLY.